United States Patent [19]

Ehlers et al.

[11] Patent Number: 4,712,616

[45] Date of Patent: Dec. 15, 1987

[54] METHOD FOR SCALE REDUCTION IN OFF-SHORE PLATFORMS

[75] Inventors: D. M. Ehlers, Addison; Daniel N. Hopkins, Dallas, both of Tex.

[73] Assignee: Mobil Oil Corporation, New York, N.Y.

[21] Appl. No.: 906,112

[22] Filed: Sep. 11, 1986

[51] Int. Cl.⁴ .................... E21B 41/02; E21B 43/34
[52] U.S. Cl. .................................. 166/266; 166/267; 166/357; 166/902; 210/747; 299/4
[58] Field of Search ............... 166/266, 267, 268, 357, 166/902; 210/707, 747

[56] References Cited

U.S. PATENT DOCUMENTS

| | | | |
|---|---|---|---|
| 2,457,959 | 1/1949 | Walker | 166/266 X |
| 2,884,132 | 4/1959 | Kangas | 166/266 X |
| 2,953,204 | 9/1960 | Doscher et al. | 166/268 X |
| 3,681,238 | 8/1972 | Emmett, Jr. | 166/268 X |
| 4,029,570 | 6/1977 | Coffman et al. | 166/267 X |
| 4,235,607 | 11/1980 | Kinder et al. | 166/267 X |
| 4,238,331 | 12/1980 | Mitchell et al. | 166/268 X |

FOREIGN PATENT DOCUMENTS 2067234  7/1981  United Kingdom ............... 166/268

Primary Examiner—George A. Suchfield
Attorney, Agent, or Firm—Alexander J. McKillop; Michael G. Gilman; Charles A. Malone

[57] ABSTRACT

A process for reducing scale formation in off-shore production platforms where sea water is used as a water-flooding medium. During production, sea water and connate water interact to make scale forming precipitates. Said precipitates fall out in an oil/water separator. Subsequently, additional sea water is injected as the separated aqueous phase leaves said separator thereby causing additional precipitates to form. Via this method, decreased amounts of scale preventing inhibitors are required.

8 Claims, 1 Drawing Figure

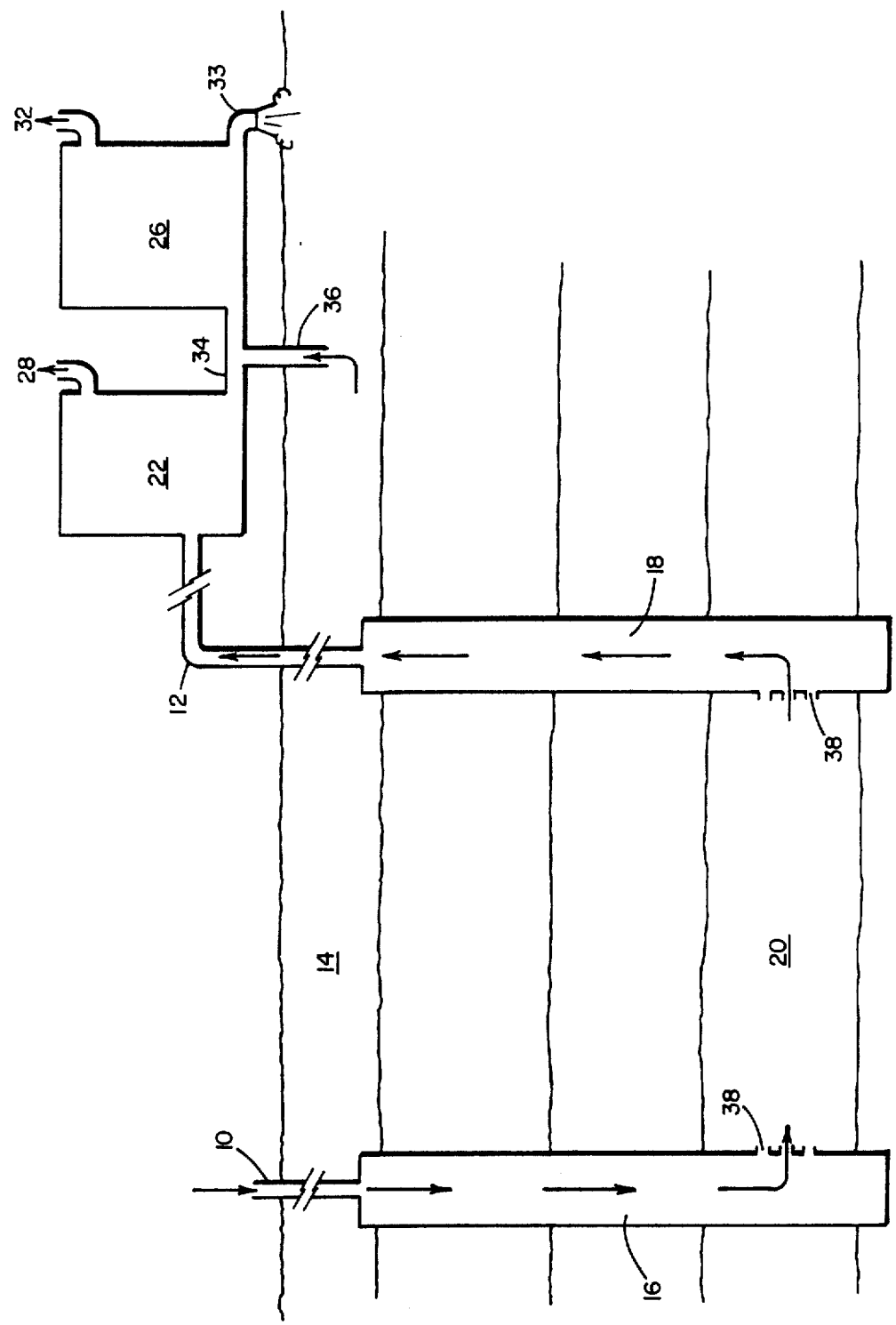

METHOD FOR SCALE REDUCTION IN OFF-SHORE PLATFORMS

FIELD OF THE INVENTION

This invention is directed to a method for removal of scale from hydrocarbonaceous fluid production equipment where salt water is used as the flood medium.

BACKGROUND OF THE INVENTION

During the production of hydrocarbonaceous fluids from offshore undersea formations, salt water is used as the flooding medium. When the salt water comes into contact with connate water in the formation, chemical compounds in both waters react together to form scale which, among other things, causes plugging of filters and coalescers used in removing oil particles from the water mixture. Presently, costly inhibitors are used to help alleviate scale forming in production equipment. However, scale forming problems continue to exist which often cause production to cease until corrective measures can be undertaken.

Therefore, what is needed is a scale-reduction method which will reduce the need for costly inhibitors and reduce production down time.

SUMMARY OF THE INVENTION

This invention is directed to a process for reducing scale formation where sea water which is incompatible with connate water is used as the flooding medium. Both waters combine to form a mixture with liquid hydrocarbonaceous fluids produced from the formation. To accomplish this, the water/liquid hydrocarbonaceous fluid is produced to the surface. Thereafter, the mixture is directed into a water/oil separator where said liquid hydrocarbonaceous fluids are substantially separated from said mixture and the remaining hydrocarbonaceous fluids are entrained in the form of oil droplets within the separated aqueous mixture.

The aqueous mixture with oil droplets therein is removed from said water/oil separator and thereafter additional sea water is added to the mixture. If sea water is not available, a made-up sulfate solution (e.g. sodium sulfate) can be added. The resultant oil/water mixture is transferred into a vessel with coalescing means. Said coalescing means causes the oil drops to coalesce and float to the upper surface. Scale forming precipitates resultant from the sea water combine with the connate water adhere to the bottom of the vessel thereby removing scale forming compounds from the water. Oil collected from the oil/water separator and the coalescer is then transferred to storage.

The process of this invention has the advantages of simplicity and effectiveness in restoring contaminants concentrations to acceptable environmental background levels. The invention thus reduces the environmental hazards to humans and animals which high levels of contaminants in the formation fluids may pose. Further advantages and features of this invention will be apparent to persons skilled in art upon reading the specification and the claims appended hereto.

It is therefore an object of this invention to reduce the scale forming tendency resultant from a mixture of salt and connate water during the production of hydrocarbonaceous fluids, particularly liquid ones.

It is another object of this invention to reduce the need for inhibitors to prevent the formation of scale on hydrocarbonaceous fluid producing equipment.

It is yet another object of this invention to reduce the "down time" caused by scale formation in production equipment.

In one embodiment, the invention comprises passing through said formation at least one pore volume of an aqueous restoration fluid which contains sulfate ions. The restoration fluid may contain from 0.01 to 1.0 grams per liter of sulfate ion.

BRIEF DESCRIPTION OF THE DRAWING

The drawing is a schematic representation of sub-sea injection and production wells fluidly connected to an oil/separator unit which is connected to a vessel containing a coalescer.

PREFERRED EMBODIMENT

In the practice of this invention, sea water 14 is injected into line 10 where it enters injection well 16. Through perforations 38 in injection well 16, sea water enters formation 20 where it drives liquid hydrocarbonaceous fluids through perforations 38 into production well water 18. A mixture of sea water, connate water, and liquid hydrocarbonaceous fluids are produced to the surface through line 12 where on an off-shore platform (not shown), it enters an oil/water separator 22. In separator 22, the liquid hydrocarbonaceous fluids rise to top while the mixture of salt and connate water with oil droplets dispersed therein settle to the bottom. Liquid hydrocarbonaceous fluids are removed from oil/water separator 22 via line 28 and sent to storage.

While in oil/water separator 22 the salt and connate water, with oil droplets interspersed therein, begin to cool which leads to the formation of precipitates from chemicals in the salt water and connate water tending to form scale. Some precipitate forms and adheres to the walls of vessel 22. The mixture of salt water and connate water, with oil droplets dispersed therein, are transported from oil/separator 22 via line 34, in which additional sea water is added, via line 36, to vessel 26 which contains a coalescer (not shown).

Upon entering vessel 26, the water mixture is cooled sufficiently which causes the precipitates to adhere to the vessel wall and grow in thickness. Vessel 26 can be constructed in a manner to retain the formed precipitates and the water returned to the sea through line 30. Of course, the concentration of chemicals in the sea or connate waters can not be controlled. Similarly, the temperature and pressure of the fluids, i.e. water and hydrocarbonaceous, exiting the formation will vary with the formation. They are for the most part formation dependent. The reactions leading to the formation of the precipitate are believed to be as follows:

Also radioactive elements (or other toxic elements) which form insoluble precipitates with sulfate ions are also removed in vessel. These precipitates adhere to the walls of vessel 26 and are removed from the liquids. This is particularly advantageous in an operation where zero discharge at certain toxic elements is allowed.

Oil droplets in the salt/connate water mixture come into contact with the coalescer in vessel 26. Contact with the coalescer causes the oil droplets to separate from the water mixture and float to the top of vessel 26. Here the oil is gathered and sent to storage via line 32.

In another embodiment of this invention, sea water or connate water can be used to restore a formation after in situ recovery of uranium. This embodiment can also be used with other radioactive or toxic elements which form insoluble precipitates with sulfate ions. The present embodiment is also applicable to surface milling operations where appropriate equipment can be utilized in removing the precipitate thus formed. A method for immobilizing contaminants in previously leached ores wherein orthophosphates are employed is disclosed in U.S. Pat. No. 4,536,034 issued to Otto, Jr. et al. on Aug. 20, 1985. This patent is hereby incorporated by reference.

While the present invention is hereinafter described in relation to restoration after in situ recovery of uranium, it should be understood that the invention is also applicable to restoration efforts after the in situ recovery of inorganic substances capable of reacting with aqueous solubilizers to form solutions miscible with water. These inorganic substances especially include iron, aluminum, titanium, copper, nickel, silver, gold, lead, zinc, manganese, cobalt, chromium, radium, thorium, calcium and magnesium. Other substances soluble in aqueous solubilizers will be apparent to those skilled in the art.

The present invention may be carried out utilizing injection and production systems as defined by any suitable arrangement of wells.

Uranium minerals frequently occur as a mixture of the insoluble tetravalent form and the soluble hexavalent form. The tetravalent form must be oxidized to its soluble hexavalent form for leaching. The oxidation of uranium to its soluble form also results in the oxidation and/or solubilization of other mineral values that are present in the formation such as calcium, magnesium, iron, aluminum, titanium, copper, nickel, chromium, manganese, cobalt, zinc, gold, silver, thorium, radium, and lead. These other mineral species may not be present in sufficient quantities to justify surface recovery. However, they are normally present in large enough quantities to require treatment of the formation fluids to reduce the concentration of these other mineral values to environmentally acceptable levels following the termination of the leaching process.

Restoration of formations that have been subjected to in situ leaching is a practice commonly required for environmental reasons. It has been found in connection with this invention that the passage through the formation of a restoration fluid which contains sulfate ions will form a precipitate with the soluble ions of the contaminants in the formation to form insoluble sulfate precipitates. For example, uranium, thorium, radium and lead sulfates are extremely insoluble in formation fluids.

Any suitable source of sulfates, especially sea water or connate water, may be utilized in accordance with the present invention. For example, alkali metal sulfates, such as sodium or potassium sulfate, may be utilized.

The concentration of the sulfate solution should be determined experimentally on a case by case basis. The amount of sulfate utilized should be adjusted such that the concentration of the contaminants in formation fluids is reduced to environmentally acceptable levels. For example, a sulfate ion concentration of from about 10 ppm to about 1000 ppm is particularly suitable.

When a carbonate or bicarbonate solution is utilized to leach the uranium, the presence of carbonate ion in the formation fluids, after the leaching step, may interfere with the precipitation of the contaminants. Accordingly, the fluids should be treated to remove the carbonate ions. For example, the addition of calcium will cause the precipitation of calcium carbonate particularly at pH values of 8 or higher. Alternatively, acid, such as hydrochloric (HCl) may be added to free the carbonate ion in the form of carbon dioxide.

Although the present invention has been described with preferred embodiments, it is to be understood that modifications and variations may be resorted to without departing from the spirit and scope of this invention, as those skilled in the art will readily understand. Such modifications and variations are considered to be within the purview and scope of the appended claims.

We claim:

1. A process for reducing scale formation wherein sea water, incompatible with connate water, is used as the flooding medium forming thereby a mixture with liquid hydrocarbonaceous fluids where said fluids are produced in off-shore platforms comprising:
   (a) producing said mixture of water and liquid hydrocarbonaceous fluids to the surface from said formation;
   (b) directing said mixture into a water/oil separator where said liquid hydrocarbonaceous fluids are substantially separated from said mixture and the remaining hydrocarbonaceous fluid is entrained in the form of oil droplets within the separated aqueous mixture;
   (c) removing said aqueous mixture with oil droplets therein from said water/oil separator and thereafter mixing the combination with additional sea water, or other aqueous solution having a similar concentration of sulfate ions, in a vessel containing a coalescing means which sea water upon contact with said connate water causes a precipitate to form thereby reducing the scale forming tendency of the water; and
   (d) collecting liquid hydrocarbons from step (b) and from said coalescing means, and disposing of the resultant water.

2. The process as recited in claim 1 where in step (a) at least one injection well and one production well are used to produce said mixture of water and liquid hydrocarbons to the surface.

3. The process as recited in claim 1 where in step (d) said water is used to remove any accumulated scale or scale forming precipitate from said precipitating means.

4. The process as recited in claim 1 wherein said coalescing means is a filter.

5. A process for reducing scale formation where sea water which is incompatible with connate water is used as the flooding medium forming a mixture with liquid hydrocarbonaceous fluids comprising:
   (a) producing said mixture of water and liquid hydrocarbonaceous fluids to the surface from said formation;
   (b) directing said mixture into a water/oil separator where said liquid hydrocarbonaceous fluids are substantially separated from said mixture and the remaining hydrocarbonaceous fluid is entrained in the form of oil droplets within the separated aqueous mixture;
   (c) removing said aqueous mixture with oil droplets therein from said water/oil separator and thereafter mixing the combination with additional sea water, or other aqueous solution having a similar concentration of sulfate ions, in a vessel containing a coalescing means which sea water upon contact with said connate water causes a precipitate to form thereby reducing the scale forming tendency of the water; and (d) collecting liquid hydrocarbons from step (b) and from said coalescing means, and disposing of the resultant water.

6. The process as recited in claim 5 where in step (a) at least one injection well and one production well are used to produce said mixture of water and liquid hydrocarbons to the surface.

7. The process as recited in claim 6 where in step (d) said water is used to remove any accumulated scale or scale forming precipitate from said precipitating means.

8. The process as recited in claim 6 where said coalescing means is a filter

* * * * *

UNITED STATES PATENT AND TRADEMARK OFFICE
CERTIFICATE OF CORRECTION

PATENT NO. : 4,712,616

DATED : December 15, 1987

INVENTOR(S) : D. M. Ehlers et al

It is certified that error appears in the above-identified patent and that said Letters Patent is hereby corrected as shown below:

Column 6, line 5, "claim 6" should read --claim 5--.

Column 6, line 8, "claim 6" should read --claim 5--.

Signed and Sealed this

Twenty-eighth Day of June, 1988

Attest:

DONALD J. QUIGG

Attesting Officer

Commissioner of Patents and Trademarks